(No Model.)

P. C. HEWITT.
LEAF FOR FLY BOOKS.

No. 435,094. Patented Aug. 26, 1890.

Witnesses:
O. Sundgren
D. H. Haywood

Inventor:
Peter Cooper Hewitt
by Attorneys
Brown & Griswold

UNITED STATES PATENT OFFICE.

PETER COOPER HEWITT, OF NEW YORK, N. Y.

LEAF FOR FLY-BOOKS.

SPECIFICATION forming part of Letters Patent No. 435,094, dated August 26, 1890.

Application filed January 11, 1890. Serial No. 336,676. (No model.)

*To all whom it may concern:*

Be it known that I, PETER COOPER HEWITT, of New York, in the county and State of New York, have invented a new and useful Improvement in Leaves for Fly-Books, of which the following is a specification.

I will describe my improvement in detail, and then point out the novel features in the claims.

My invention relates to leaves for holding fishing flies, gut-hooks, or gut, as in a fly-book, on which leaves the flies, &c., can be more conveniently and compactly arranged and carried than has heretofore been done. The fly-leaf may be made of substantially water-proof paper, metal, or any other suitable substantially water-proof material capable of being cut so as to form lips or tongues which will hold the flies, &c., to the leaf when they are slipped under the lips or tongues, and some of which may also hold the loops at the end of the flies, as shown in the accompanying drawings.

Figure 2:
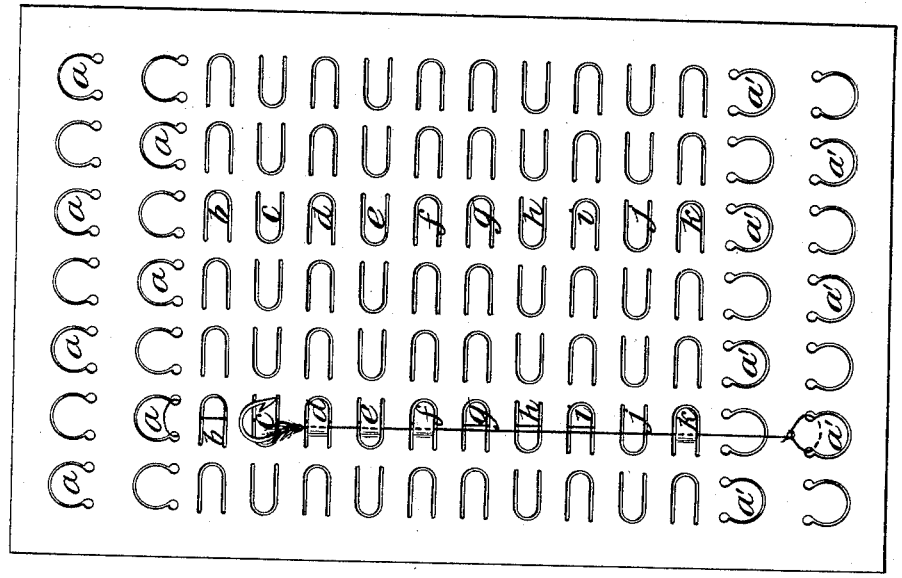
Figure 1:
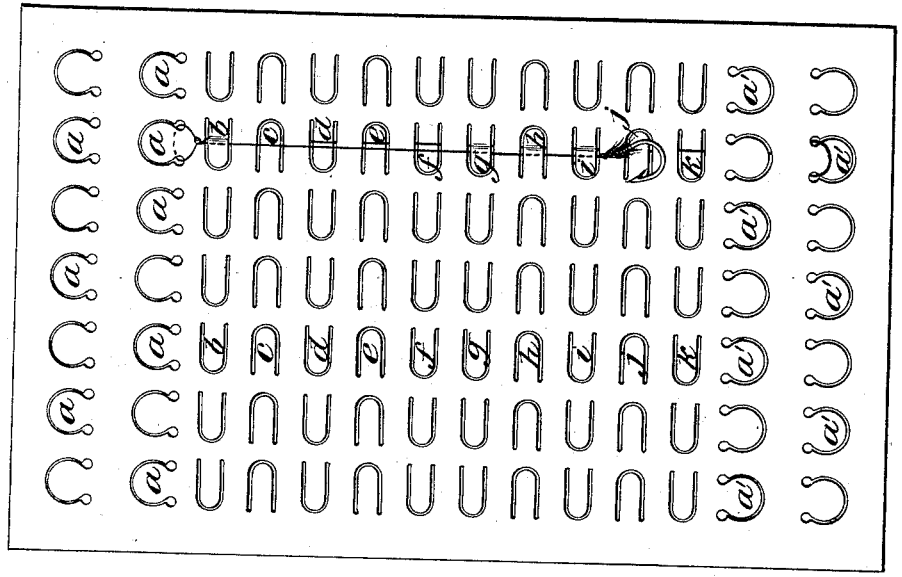

Figure 1 is a view of one side of the leaf, and Fig. 2 is a view of the other side.

Similar letters of reference designate corresponding parts in both the figures.

The fly-leaf is illustrated with the lips or tongues cut in the manner I prefer; but the shape, size, and arrangement of these are not essential. Such lips or tongues may be cut by a die or cutter.

In the drawings, the tongues $a\ a\ a'\ a'$ are tongues for receiving the end loops of the snell, gut, or gut-hooks, and $b\ c\ d\ e\ f\ g\ h\ i\ j\ k$ are tongues cut at right angles to $a$ and $a'$. In Fig. 1 a fly is shown held by the tongues $b$, $g$, $h$, and $i$, with the loop over one of the tongues $a$. It is not necessary to put the hook under a tongue, as the gut will hold it in place. Nor is it necessary to pass the gut under $c$, $d$, $e$, and $f$, the three tongues $g\ h\ i$, with $a$ and $b$, being sufficient to hold it in place. On the other side of the same leaf, either of the tongues $a'\ a'$, with $k$ and $d, e,$ and $f$, (which, being simply cut from the leaf, can be used on either side indifferently,) will permit another fly to be laid in and held with the loop at the bottom. In holding old flies, it may be necessary to use more tongues than in the case herein described, so as to keep the gut flat.

By the words "hook" and "fly," as herein employed, is meant the hook with or without feathers, together with the gut attached according to the common use of fishermen.

What I claim as my invention, and desire to secure by Letters Patent, is—

1. A book provided with a leaf having holding tongues cut in it, the tongues having a swinging movement outward from the surface of the leaf on either side at pleasure to hold the flies, gut-hooks, &c., substantially as specified.

2. A leaf of water-proof material provided with tongues cut in it for holding flies, gut-hooks, &c., the tongue for receiving the looped end of the gut being cut so as to point in a direction transverse to the tongue or tongues for retaining the body portion of the gut, substantially as set forth.

PETER COOPER HEWITT.

Witnesses:
  FREDK. HAYNES,
  GEO. BARRY.